(12) United States Patent  
Kinnear

(10) Patent No.: US 8,733,789 B1
(45) Date of Patent: May 27, 2014

(54) SLEEVE FOR LAP AND SHOULDER BELT TO REDUCE WEAR ON APPAREL

(75) Inventor: Alison C. Kinnear, Denver, CO (US)

(73) Assignee: Alison C. Kinnear, Denver, CO (US)

( * ) Notice: Subject to any disclaimer, the term of this patent is extended or adjusted under 35 U.S.C. 154(b) by 0 days.

(21) Appl. No.: 13/569,751

(22) Filed: Aug. 8, 2012

Related U.S. Application Data

(60) Provisional application No. 61/521,117, filed on Aug. 8, 2011.

(51) Int. Cl.
*B60R 21/18* (2006.01)
(52) U.S. Cl.
USPC .......................................................... 280/733
(58) Field of Classification Search
USPC .......................................................... 280/733
See application file for complete search history.

(56) References Cited

U.S. PATENT DOCUMENTS

| | | | |
|---|---|---|---|
| 5,016,915 A | 5/1991 | Perry | |
| 5,566,871 A | 10/1996 | Weintraub | |
| 5,569,134 A | 10/1996 | Nordanger | |
| 5,794,971 A * | 8/1998 | Boydston et al. | 280/733 |
| 5,863,065 A * | 1/1999 | Boydston et al. | 280/733 |
| 5,871,230 A * | 2/1999 | Lewis | 280/733 |
| 6,431,939 B1 | 8/2002 | Roh et al. | |
| 6,688,642 B2 * | 2/2004 | Sollars, Jr. | 280/733 |
| 6,922,876 B2 | 8/2005 | Kobayashi | |
| 7,066,535 B2 | 6/2006 | Moses | |
| 7,213,308 B2 | 5/2007 | Kobayashi | |
| 7,229,182 B2 | 6/2007 | Schrader et al. | |
| 7,232,357 B2 | 6/2007 | Chen | |
| 7,318,606 B1 | 1/2008 | Berke | |
| 7,322,603 B2 * | 1/2008 | Gray et al. | 280/733 |
| 7,780,501 B2 | 8/2010 | Kim | |
| 7,971,763 B2 | 7/2011 | Chace | |
| 2005/0104357 A1 | 5/2005 | Olson | |
| 2005/0121967 A1 | 6/2005 | Crowl | |
| 2012/0319386 A1 * | 12/2012 | Bahr et al. | 280/733 |

FOREIGN PATENT DOCUMENTS

| | | |
|---|---|---|
| GB | 2220344 A | 1/1990 |
| GB | 2324279 A | 10/1998 |
| JP | 08207702 A | 8/1996 |
| JP | 09011849 A | 1/1997 |
| JP | 09142250 A | 6/1997 |
| JP | 09277903 A | 10/1997 |
| JP | 2000211472 A | 8/2000 |
| JP | 2002087205 A | 3/2002 |
| JP | 2002137712 A | 5/2002 |
| JP | 2002137713 A | 5/2002 |
| WO | WO-2009061232 A1 | 5/2009 |

* cited by examiner

*Primary Examiner* — Faye M. Fleming
(74) *Attorney, Agent, or Firm* — Perkins Coie LLP

(57) ABSTRACT

A sleeve attachable to the belt of a vehicle restraint system is provided. The sleeve is loose and not form fitted to the belt to reduce the frictional wear of the sleeve with respect to apparel. In one aspect, a strip of material connects the sleeve to the fastener such that the sleeve moves with the belt. In another aspect, an inner sleeve is tightly formed to the belt such that the sleeve moves with the belt.

9 Claims, 4 Drawing Sheets

SLEEVE FOR LAP AND SHOULDER BELT TO REDUCE WEAR ON APPAREL

CLAIM OF PRIORITY UNDER 35 U.S.C. §119

The present application claims priority to U.S. Provisional Patent Application Ser. No. 61/521,117, filed Aug. 8, 2011, which is incorporated herein as if set out in full.

CLAIM OF PRIORITY UNDER 35 U.S.C. §120

None.

REFERENCE TO CO-PENDING APPLICATIONS FOR PATENT

None.

BACKGROUND

1. Field

The technology of the present application relates generally to vehicle restraint systems, and more specifically to providing a sleeve on the vehicle restraint to inhibit or reduce the wear on apparel.

2. Background

Vehicle retraining systems are required in modern cars, trucks, and other vehicles. The retraining systems generally comprise a single belt that is attached to the car frame in two spots and a buckle such that the belt forms a triangular shape with a portion of the belt extending over a persons abdomen (or lap) and a portion of the belt extending diagonally across a person's core (which may include a portion of the shoulder, chest, and abdomen). The vehicle restraining systems are designed to fit snuggly about the rider and to allow a range of motion and flexibility. However, the vehicle restraining systems also are designed to lock against sudden acceleration to inhibit a rider from being harmed during an accident or the like. The vehicle restraining systems are mandated by law in some States and Countries.

As can be appreciated, the vehicle restraining systems are mostly designed for safety and functionality. The fabric used for the belts is a durable fabric. The snug fit of the belt and the materials used to construct the belt, necessary for safety perhaps, result in friction on a rider's apparel that is a result, in part, from the apparel being pinched between the rider's body and the belt.

The friction and wear on apparel and the like can, over time, cause damage to the apparel. For example, the wear of the belt over a rider's abdomen may cause holes in the apparel to appear.

Many devices have been proposed to inhibit the wear between the rider's apparel and the belt. Some of the devices are attached to the abdomen or lap portion of the belt, others are attached to the shoulder or core portion of the belt. Generally, the devices are attached by wrapping the device to the belt. All these devices, however, suffer similar drawbacks. One drawback in particular is the fact that the devices need to be positioned each time the belt is drawn across the rider. Moreover, the devices tend to move as a rider shifts and adjusts the seating position and that decreases the overall efficiency of the devices. Many times the devices, although used initially, end up forgotten and either discarded or not used regularly diminishing the effectiveness of the device. Additionally, the devices themselves are frequently tight or snug against the body causing a similar interaction as the restraining system.

Thus, development and introduction of a sleeve that deploys simply by coupling to the vehicle restraint is necessary. Also, in some aspects, it would be beneficial to provide a sleeve that deploys loosely to reduce some of the frictional engagement.

SUMMARY

The Summary is provided to introduce a selection of concepts in a simplified and incomplete manner highlighting some of the aspects further described in the Detailed Description. This Summary, and the foregoing Background, is not intended to identify key aspects or essential aspects of the claimed subject matter. Moreover, this Summary is not intended for use as an aid in determining the scope of the claimed subject matter.

In one aspect of the technology of the present application, a sleeve slidably coupled to a vehicle restraint is provided. The sleeve may be made from a material having a lubricity to reduce wear and the like on apparel. In one aspect, the sleeve is coupled to the fastener coupled to the belt of the vehicle restrain system. Thus, when the rider moves the fastener across the body to fit the fastener in the receiver and buckle the vehicle retrain system, the sleeve moves with the fastener and the belt slidingly moves through a channel in the sleeve to automatically deploy the sleeve about the body. In one embodiment, the sleeve is associated with a lap belt. In another embodiment, the sleeve is associated with a shoulder belt. In yet another embodiment, the sleeve is associated with both the lap and shoulder belt.

In another aspect of the technology of the present application, a sleeve is slidably coupled to the vehicle restraint is provided. The sleeve may be formed from a material having an outer and an inner sleeve. The outer sleeve is designed to loosely hang from the inner sleeve. The inner sleeve is designed to grasp the vehicle restraint belt snuggly. The snug fit provides that the inner sleeve, and hence the entire device is movable with relation to the vehicle restraint belt but allows for a loose outer sleeve to inhibit friction and wear on the user's apparel.

These and other aspects of the technology of the present application will be apparent after consideration of the Detailed Description and Figures herein. It is to be understood, however, that the scope of the application shall be determined by the claims as issued and not by whether given subject matter addresses any or all issues noted in the Background or includes any features or aspects highlighted in this Summary.

DETAILED DESCRIPTION

The technology of the present patent application will now be explained with reference to various figures, tables, and the like. While the technology of the present application is described with respect to positioning a sleeve to the lap portion of a seatbelt associated with a conventional car or automobile, one of ordinary skill in the art will now recognize on reading the disclosure that the inventive sleeve may be used in many applications such as, for example, safety belts associated with airplanes, alternative vehicle harnesses, amusement park rides, and the like. Moreover, the technology of the present patent application will be described with reference to certain exemplary embodiments herein. The word "exemplary" is used herein to mean "serving as an example, instance, or illustration." Any embodiment described herein as "exemplary" is not necessarily to be construed as preferred or advantageous over other embodiments absent a specific indication that such an embodiment is preferred or advantageous over other embodiments. Moreover, in certain instances only a single "exemplary" embodiment is provided. A single example is not necessarily to be construed as the only embodiment. The detailed description includes specific details for the purpose of providing a thorough understanding of the technology of the present patent application. However, on reading the disclosure, it will be apparent to those skilled in the art that the technology of the present patent application may be practiced with or without these specific details.

Figure 1:
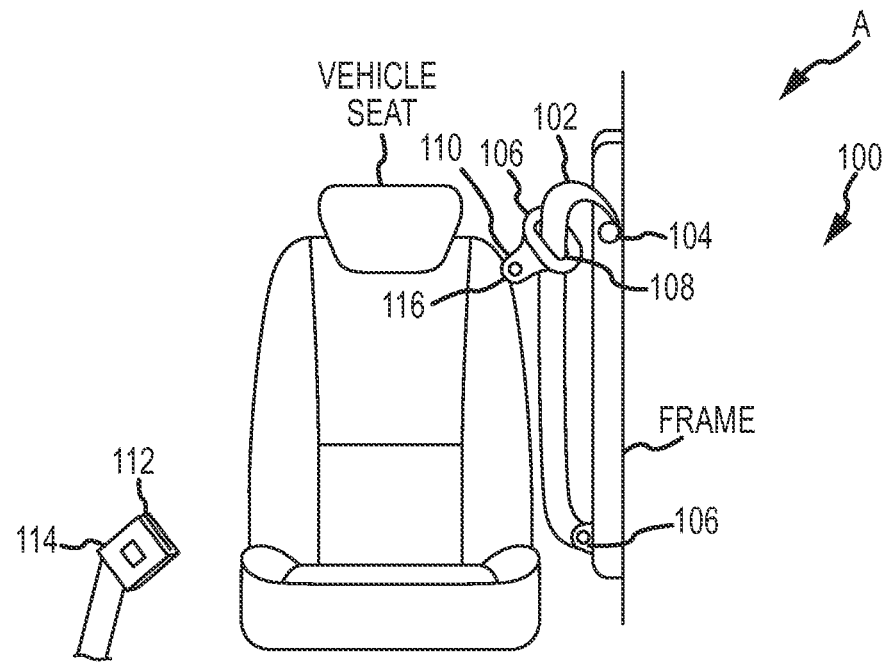
FIG. 1 is a view of a vehicle restraint system that is capable of using the technology of the present application in the stowed position.
Figure 2:
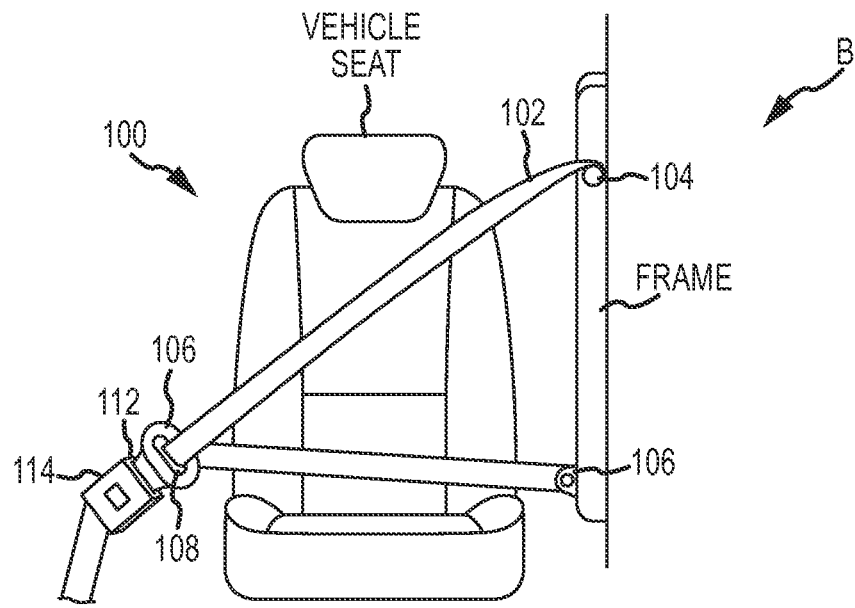
FIG. 2 is a view of a vehicle restraint system that is capable of using the technology of the present application in the deployed position.

Referring first to FIGS. 1 and 2, an illustration of a vehicle restraint system 100 is provided. FIG. 1 shows the vehicle restraint system 100 in the stowed or non-use position A and FIG. 2 shows the vehicle restraint system 100 in the deployed or use position B. The vehicle restraint system 100 is shown as a three point system including a belt 102 anchored to a reel 104 at a first end and to the car frame at termination 106. The reel 104 provides for automatic retraction of the belt 102 into the stowed position A as shown in FIG. 1. The belt 102 has a male fastener 106 slidingly coupled to the belt 102. As shown, the fastener 106 has a through hole 108 that allows belt 102 to freely move with respect to the fastener 106. The fastener 106, opposite the through hole 108, has a male fitting 110 that inserts to a corresponding female socket 112 on the receiver 114. The receiver 114 has a detent (not shown) that is spring loaded to engage a hole 116 on the male fitting. The reel 104 allows the belt 102 to extend when a vehicle rider moves the fastener 106 to releasably engage the receiver 114. The reel 104 retracts the belt 102 automatically when the fastener 106 is disengaged from the receiver 114. Moreover, acceleration of the belt over a predefined limit causes the reel 104 to lock. As the operation of a conventional vehicle restraint is generally known to those of ordinary skill in the art, the operation of the vehicle restraint system 100 will not be further explained herein and the above description is largely for contextual reference in regard to the technology of the present application.

Figure 3:
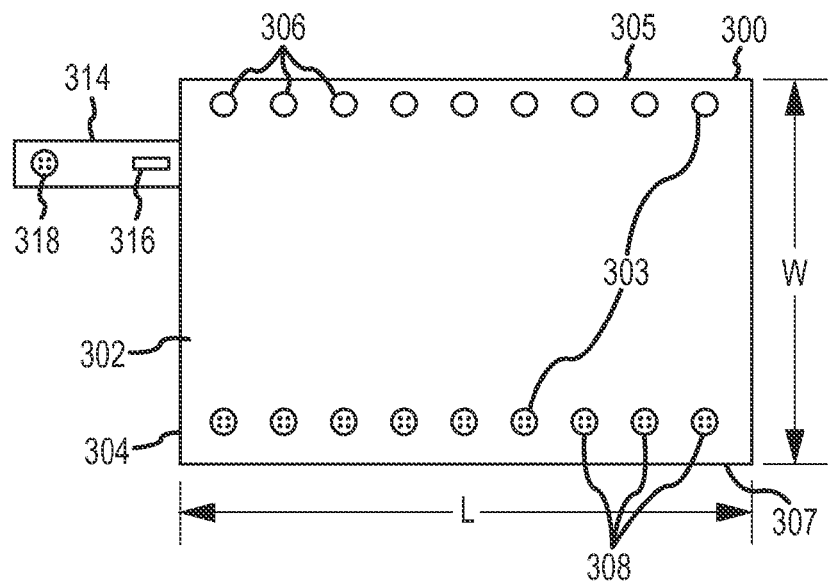
FIG. 3 is a plan view of the technology of the present application usable with the vehicle restraint system.
Figure 4:
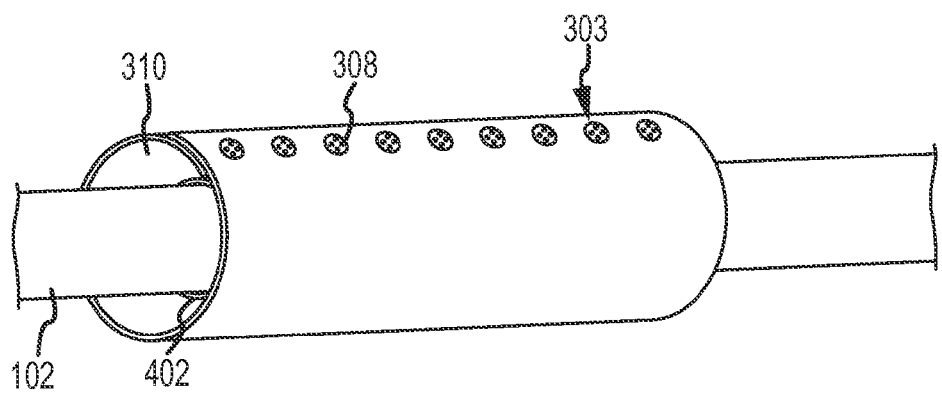
FIG. 4 is a perspective view of the technology of FIG. 3 in use on a belt associated with the vehicle restrain system.

Referring now to FIGS. 3 and 4, a sleeve 300 consistent with the technology of the present invention is shown. The sleeve 300 is formed from a conventional fabric such as, for example, a conventional polyester, Rayon, or nylon, and may be spandex, lycra, or the like. The sleeve 300 has a first side 302 and a second side 304 opposite the first side 302. Either or both of the first and second side 302, 304 may be fleeced or have padding for comfort or the like. While many fabrics would be acceptable, generally it is preferable to make the sleeve 300 out of a fabric that has a higher lubricity than the belt 102 of the restraint system 100. Fabrics with a lower lubricity are acceptable as the sleeve 300 covers the edges of the belt 102, which lowers the abrasion caused by the belt 102 and reduces the wear on apparel. The sleeve 300 has a length L and a width W where the length is generally longer than the width. The sleeve 300 has opposite ends 305, 307 with connectors 303 that operatively engage each other to allow sleeve 300 to form a channel 310. In one exemplary embodiment, the connectors 303 are buttons and button holes. For example, the sleeve 300 has a plurality of button holes 306 on first end 305 and a corresponding plurality of buttons 308 on the second end 307. Generally, the total number of button holes 306 equals the total number buttons 308, but it is not necessary to have a one for one correspondence. Additionally, while all the buttons are shown on a one side of the sleeve and the button holes are shown on the opposite side of the sleeve, it is possible to intermix the buttons and button holes. Also, while shown and described as buttons 308 and button holes 306, the sleeve 300 may include other fastening devices such as, for example, hook and loop fasteners, snaps with a male protrusion and a female socket, adhesives, glues, tapes, zippers, or the like to name but a few connectors that could be used.

Figure 5:
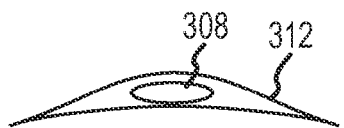
FIG. 5 is a sectional view of a portion of the sleeve and closure mechanism.

The buttons 308 and button holes 306 allow the sleeve 300 to be wrapped about the belt 102 and secured such that belt 102 can slidingly received in a channel 310 formed by the sleeve. In certain embodiments, the buttons holes 306 are provided with a cover 312 as shown in FIG. 5 such that the buttons 308 are not exposed and do not cause additional abrasion on or wear to the adjacent apparel.

Referring back to FIG. 3, at least one side of the sleeve 300 includes a strip of material 314 extending in the length direction. The strip of material 314 may be the same material as the sleeve 300 or may be a different material, such as, a ribbon or the like. The strip of material 314 has a button hole 316 and a button 318 attached to opposite ends of the strip of material 314. In this exemplary embodiment, the button hole 316 is shown proximate the sleeve 300 on the strip of material 314, but the button and button hole may be reversed. Similar to the button holes 306, the button hole 316 may be provided with a cover. The button 318 and button hole 316 may similarly be replaced with any of hook and loop fasteners, snaps with a male protrusion and a female socket, adhesives, glues, tapes, zippers, snap tape, hook and eye tape, or the like to name but a few connectors that could be used. The strip of material 314 may be woven with sleeve 300 or a separate material coupled to the sleeve 300. The strip of material 314 may be stitched, for example, on one end to sleeve 300. Instead of stitched, the strip of material 314 may be attached using a heat weld, adhesive, glue, tapes, zippers, buttons, snaps, hook and loop material, snap tape, hook and eye tape, or the like.

Figure 6:
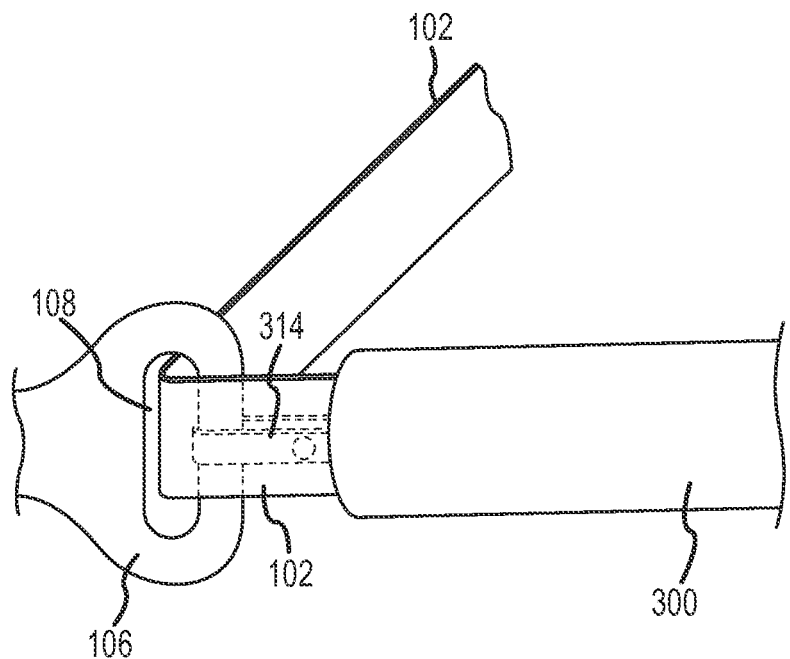
FIG. 6 is a view of the technology of the present application usable with the vehicle restraint system.
Figure 7:
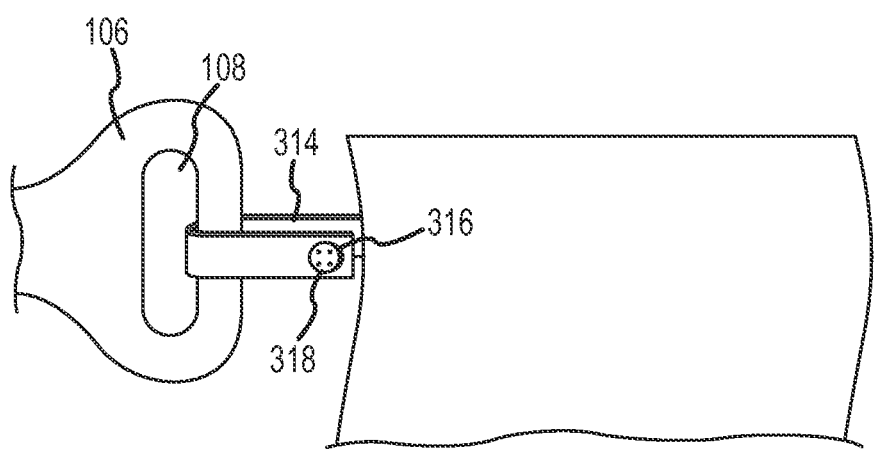
FIG. 7 is another view of the technology of the present application usable with the vehicle restraint system.

Referring now to FIG. 6, a portion of fastener 106 having the hole 108, which the belt 102 extends through is provided. A portion of fastener 106 behind the belt 102 is shown by dashed lines. The sleeve 300 is slidingly disposed or wrapped about the belt 102 (although the buttons are not shown for convenience). The strip of material 314 extending from the sleeve 300 is looped around the fastener 106 and buttoned coupling the sleeve 300 to the fastener 106. This causes sleeve 300 to move with fastener 106 as will be explained further below. Refigure 7 shows the attachment of the sleeve 300 to the fastener 106 without the belt 102 for ease of reference. Instead of looping the strip of material 314 through hole 108 and back to the sleeve 300 to form a loop, the strip of material 314 may be tied, using a zip tie, a conventional knot, or the like, to fastener 106. Additionally, the end of the strip of material 314 not attached to the sleeve 300 may be fitted with a clip, a quick disconnect, or a karabiner type of connector. In some embodiments, fastener 106 and the strip of material 314 may be fitted with cooperatively engaging pieces to allow for coupling, such as, for example, a snap-fitting, a quick disconnect, or the like.

In still other aspects, the sleeve 300 may be provided with a button on one end to cooperatively engage one or more button holes on the strip of material 314. Thus, for example, the strip of material may have a first button hole that is cooperatively engaged to the button on the sleeve 300. The strip of material 314 is looped through the hole 108 on fastener 106. The second button hole on the strip of material 314 is cooperatively engage to the button for another corresponding button) on the sleeve 300.

The sleeve 300 may be connected to the belt 102 or the frame of the vehicle at the end opposite the strip of material 314 to facilitate automatic deployment of the sleeve as will be explained below.

Also, while shown as a single strip of material 314 that loops around the fastener 106, the strip of material 314 may be a plurality of strips of material 314. Each of the plurality of strips of material 314 would have a first end that is coupled to the sleeve 300, as explained above. The second end, distal to the first end and opposite the sleeve, would fasten about fastener 106. For example, the second ends would be tied such that a loop of material is formed operationally coupling the sleeve to the fastener.

With reference back to FIG. 4, instead of or in combination with a strip of material 314 to couple the sleeve 300 to the fastener 106, the sleeve 300 may have an inner sleeve 402 coupled the sleeve 300, which sleeve 300 may be referred to as an outer sleeve 300 when used in conjunction with an inner sleeve 402. The inner sleeve 402 may tightly or snuggly fit about belt 102 such that inner sleeve 402 and the connected outer sleeve 300 moves with belt 102. The outer sleeve 300, however, would still be loose about the belt 102 ideally reducing the frictional wear on apparel.

Figure 8:
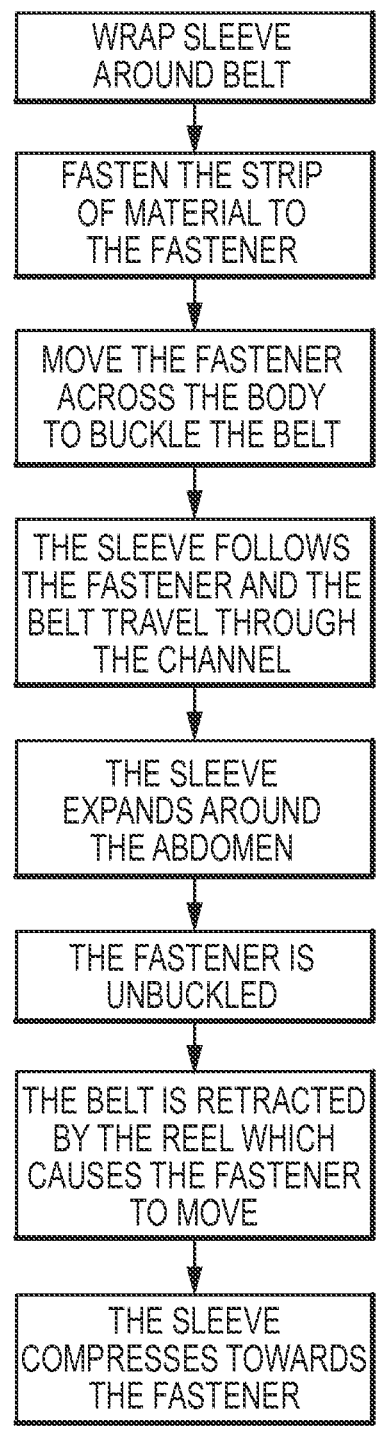
FIG. 8 is an exemplary methodology of using the technology of the present application.

Referring now to FIG. 8, an exemplary methodology for using the technology of the present application is provided. While shown as a series of discrete steps, the steps may be performed in alternative order without departing from the spirit and scope of the technology of the present application. First, the sleeve 300 is wrapped about the belt 102, step 802. Next, the strip of material 314 is looped about fastener 106 such that the sleeve moves along belt 102 with the fastener 106, step 804. If an inner sleeve is used, the looping the strip of material 314 may be optional and the inner sleeve and outer sleeve would be wrapped at substantially the same time although generally the inner sleeve would be secured prior to the outer sleeve. When the belt 102 is stowed, the sleeve 300 is attached to fastener 106 (or otherwise secured to the belt as described) and may be compressed along belt 102. The rider would deploy the belt 102 by moving fastener 106 across the body to releasably buckle the fastener to receiver 114, step 806. The sleeve 300 follows fastener 106 and allows belt 102 to slidingly travel through channel 310 formed by the sleeve, step 808. The friction of the belt 102 traveling through channel 310 causes the sleeve 300 to expand around the abdomen of the rider, step 810. Similarly, when the rider vacates the vehicle, the fastener 106 is removed from the receiver 114 (or unbuckled), step 812. The rider allows the belt 102 to be retracted by reel 104, which causes the fastener 106 to move towards the vehicle frame, step 814. The friction of the belt 102 moving through channel 310 causes the sleeve to compress towards fastener 105. Of course, rather than relying on friction, the end of the sleeve 300 opposite the strip of material 314 may include adhesive to couple the sleeve 300 to a spot on the belt or frame. Also, the sleeve may be sufficiently snug such that a friction fitting is formed between the sleeve and the belt to facilitate expansion and compression of the sleeve as the belt moves.

While shown and described as a lap belt accessory, the sleeve may be configured for use as a shoulder belt accessory.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. An apparatus, comprising:
a sleeve made from a fabric having a first side and a second side opposite the first side, the fabric having a length and a width separating a first end and a second end;
a connector attached to the fabric such that the first end and the second end of the sleeve are coupled to form a channel adapted to slidingly receive a belt of a vehicle restraining system;
a strip of material attached to the sleeve, the strip of material adapted to be coupled to a fastener of a vehicle restraining system such that when the fastener is moved across a body, the sleeve is adapted to deploy across the abdomen of the body.

2. The apparatus of claim 1 wherein the sleeve is formed from a lubricious fabric.

3. The apparatus of claim 1 wherein the sleeve is selected from a group of fabrics consisting of: polyester, rayon, or nylon.

4. The apparatus of claim 1 wherein the connector comprises an adhesive.

5. The apparatus of claim 1 wherein the connector comprises a plurality of button holes and a corresponding plurality of buttons.

6. The apparatus of claim 5 wherein the plurality of button holes resides on the first end and the plurality of buttons resides on the second end.

7. The apparatus of claim 1 wherein the connector comprises hook and loop material.

8. The apparatus of claim 1 wherein the connector is a snap.

9. A method of securing an automatically deployable sleeve to a belt of a vehicle restraint system to inhibit damage to apparel comprising the steps of:
providing a lubricious fabric that is formable into a sleeve having a channel;
removably securing the fabric to the belt such that the fabric surrounds the belt of the vehicle restraint system such that the fabric is slidingly coupled to the belt;
operationally connecting the fabric to a fastener of the vehicle restraint system such that the fabric moves with the fastener;
moving the fastener across a body such that the fabric moves with the fastener and deploys across the body.

* * * * *